(12) United States Patent
Koh et al.

(10) Patent No.: US 8,779,047 B2
(45) Date of Patent: Jul. 15, 2014

(54) COATING COMPOSITION

(75) Inventors: Meiten Koh, Settsu (JP); Nobuyuki Komatsu, Settsu (JP); Kouji Yokotani, Settsu (JP); Miharu Matsumura, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 12/307,829

(22) PCT Filed: Jul. 9, 2007

(86) PCT No.: PCT/JP2007/063662
§ 371 (c)(1),
(2), (4) Date: Jan. 7, 2009

(87) PCT Pub. No.: WO2008/013048
PCT Pub. Date: Jan. 31, 2008

(65) Prior Publication Data
US 2009/0281224 A1 Nov. 12, 2009

(30) Foreign Application Priority Data

Jul. 27, 2006 (JP) ............................. 2006-204802

(51) Int. Cl.
*C08K 3/22* (2006.01)
*C08K 5/1515* (2006.01)
*H01G 4/32* (2006.01)
*H01G 4/18* (2006.01)
*H01G 4/12* (2006.01)

(52) U.S. Cl.
CPC .............. *H01G 4/32* (2013.01); *H01G 4/1227* (2013.01); *H01G 4/1236* (2013.01); *C08K 3/22* (2013.01)
USPC ........... 524/413; 524/435; 524/436; 361/323; 361/301.5; 361/321.5

(58) Field of Classification Search
USPC ............... 524/413, 435–436; 361/323, 301.5, 361/322, 321.4–321.5
IPC ..................................................... H01G 4/18
See application file for complete search history.

(56) References Cited

U.S. PATENT DOCUMENTS

| | | | | | |
|---|---|---|---|---|---|
| 3,660,328 | A | * | 5/1972 | Lindquist | 524/145 |
| 4,752,857 | A | * | 6/1988 | Khoury et al. | 361/321.5 |
| 5,089,070 | A | * | 2/1992 | McAndrew | 156/89.14 |
| 5,313,141 | A | * | 5/1994 | Kimball | 315/169.3 |
| 5,490,035 | A | * | 2/1996 | Yen et al. | 361/311 |
| 5,739,193 | A | * | 4/1998 | Walpita et al. | 524/413 |
| 5,966,067 | A | * | 10/1999 | Murakami et al. | 338/309 |
| 6,162,535 | A | * | 12/2000 | Turkevich et al. | 428/372 |
| 6,577,492 | B2 | * | 6/2003 | O'Bryan, Jr. | 361/311 |
| 7,542,265 | B2 | * | 6/2009 | Tan et al. | 361/321.1 |
| 2003/0059366 | A1 | * | 3/2003 | Venigalla et al. | 423/598 |
| 2003/0215606 | A1 | * | 11/2003 | Clancy et al. | 428/141 |
| 2005/0029515 | A1 | * | 2/2005 | Nagai et al. | 257/40 |
| 2005/0154110 | A1 | * | 7/2005 | Takaya et al. | 524/413 |
| 2006/0093805 | A1 | * | 5/2006 | Lin et al. | 428/295.1 |
| 2006/0159927 | A1 | | 7/2006 | Hara et al. | |
| 2006/0167139 | A1 | * | 7/2006 | Nelson et al. | 523/212 |
| 2009/0103236 | A1 | * | 4/2009 | Nonaka et al. | 361/320 |
| 2009/0306264 | A1 | * | 12/2009 | Koh et al. | 524/413 |

FOREIGN PATENT DOCUMENTS

| | | | | |
|---|---|---|---|---|
| GB | 2200128 | A | * | 7/1988 |
| JP | 53138448 | A | * | 12/1978 |
| JP | 59010843 | A | * | 1/1984 |
| JP | 1-274310 | A | | 11/1989 |
| JP | 01274311 | A | * | 11/1989 |
| JP | 02-177310 | A | | 7/1990 |
| JP | 2-177310 | A | | 7/1990 |
| JP | 03116706 | A | * | 5/1991 |
| JP | 03-154316 | A | | 7/1991 |
| JP | 2004-119483 | A | | 4/2004 |
| JP | 2004285105 | A | * | 10/2004 |
| JP | 2005038821 | A | * | 2/2005 |
| JP | 2005-078806 | A | | 3/2005 |
| JP | 2006-120326 | A | | 5/2006 |
| KR | 1989-019348 | | * | 8/1991 |
| KR | 627248 | B1 | * | 9/2006 |
| WO | 2004/090912 | A1 | | 10/2004 |

OTHER PUBLICATIONS

CAPlus Abstract of JP01274311A, AN: 1990:190348 and RN 2530-83-8, 3 pages.*
Machine translated English equivalent of KR 627248 B1, 10 pages.*
CAPlus Abstract of JP 03116706A, AN 1991:596289, 1 page.*
CAPlus Abstract of JP 59010843A, AN 1984:212204, 1 page.*
CAPlus Abstract of CN 1563194, AN 2005:1089678, 2 pages.*
CAPlus Abstract of JP53138448A, AN 1979:144956, 2 pages.*
Derwent Abstract of JP53138448A, AN 1979:04704B.*
Derwent Abstract of KR 9303969 B (Acc. No. 1993-402100).*
Derwent Abstract of JP 2004-285105 (Acc. No. 2004-739917).*
Japanese Abstarct of JP 2005-038821.*

\* cited by examiner

*Primary Examiner* — Brieann R Fink
(74) *Attorney, Agent, or Firm* — Sughrue Mion, PLLC

(57) ABSTRACT

There is provided a coating composition comprising (A) a thermoplastic non-fluorine-containing polymer, (B) inorganic ferroelectric particles, (C) an affinity-improving agent comprising at least one of a coupling agent, a surfactant and an epoxy group-containing compound, and (D) a solvent, and there is provided a film formed using the coating composition which has highly dielectric property and low dielectric loss, can be made thin, is excellent in winding property (flexibility) and is suitable as a highly dielectric film for a film capacitor.

5 Claims, No Drawings

COATING COMPOSITION

TECHNICAL FIELD

The present invention relates to a coating composition for forming, for example, a highly dielectric film for a film capacitor, and to a highly dielectric film formed using the coating composition.

BACKGROUND ART

In recently years, plastic insulating materials are expected as film materials for film capacitors for communication, electronic devices, electric power, medium and low voltage phase advancement and inverter, piezoelectric devices, pyroelectric devices and dielectric materials for carrying transferring substance since they have a high insulation resistance, excellent frequency characteristics and excellent flexibility.

A film capacitor is usually comprised of a film structure comprising a dielectric polymer film subjected to aluminum or zinc deposition on its surface, or a film structure comprising multi-layers of aluminum foils and dielectric polymer films, and recently there are used a lot of film capacitors comprising a dielectric polymer film and an electrode formed thereon by metal deposition.

Hydrocarbon polymers such as polypropylene, polyester and polyphenylene sulfide are studied as a dielectric polymer for a film of film capacitor. However, a dielectric constant of such a film alone is only about 2.3 to about 3.

It is known that a capacity of a film capacitor is proportional to a dielectric constant of a film used and reversely proportional to a film thickness.

Therefore, making a film thinner has been studied, but if a film is made too thin, film formation becomes difficult, and lowering of a withstand voltage is recognized. Accordingly, there is a limit in making a film thinner.

For making a dielectric constant of a film itself higher, highly dielectric polyvinylidene fluoride polymer and cyanoethylated pullulan have been studied as a polymer. However, dielectric constants of any of these films are not more than 20, and in addition, it is difficult to make the films thinner.

In recent years, making a size of a film capacitor smaller and its capacity larger has been advanced, and as a result, it is strongly demanded to make a dielectric constant of a film capacitor higher.

A proposal of incorporating inorganic particles having an especially high dielectric constant with a polymer to make a film was made as one of means for making a dielectric constant of a capacitor film higher.

For mixing inorganic ferroelectric particles to a polymer and making a film, there are known (1) a melt-kneading method and (2) a coating method.

The melt-kneading method (1) is a method of kneading inorganic ferroelectric particles and a polymer at a temperature of not less than a melting temperature of the polymer, making the mixture into a film by a melt-extrusion method or an inflation method, and if necessary, subjecting the film to stretching treatment. In this method, there are known the use of a hydrocarbon polymer such as polyphenylene sulfide, polypropylene or polyester (JP2000-501549A and JP2000-294447A) and the use of a vinylidene fluoride polymer (for example, JP59-43039A, JP60-185303A and JP58-69252A). However, it is difficult to produce a thin film having a high dielectric constant and few voids.

The coating method (2) is a method of producing a film by dissolving a polymer in a solvent, adding and mixing inorganic ferroelectric particles thereto to make a coating composition, and then forming a film by a coating method.

In the coating method (2), the use of thermosetting hydrocarbon polymers or precursors thereof being excellent in heat resistance and mechanical strength such as aromatic polyamide, aromatic polyimide and an epoxy resin (JP2001-106977A, JP1-248404A, JP4-160705A, JP2-206623A and JP2002-356619A), and the use of a vinylidene fluoride polymer (JP54-129397A) are known.

In the case of using a thermosetting hydrocarbon polymer, it is possible to produce a thin film having high mechanical strength, but a dielectric loss of the film is large and the film becomes hard. Therefore, it cannot be said that such a film is suitable as a film for a film capacitor which is required to have excellent winding property (flexibility). Especially, a system obtained by adding and mixing inorganic ferroelectric particles is very hard, and is used for an embedded capacitor, making use of its property of being hard.

In the case of using a polyimide precursor, heat treatment at 200° to 400° C. for 20 minutes is necessary, and productivity is lowered.

In the case of using a vinylidene fluoride polymer, it is difficult to obtain a film in which inorganic ferroelectric particles are homogeneously incorporated in a vinylidene fluoride polymer, and further improvement in making a film thin and increasing a dielectric constant is required.

Further, it is proposed to produce a sheet comprising highly incorporated inorganic ferroelectric particles by press-molding composite particles prepared by coating inorganic ferroelectric particles with a vinylidene fluoride polymer (JP61-224205A). However, the film is as thick as 150 μm, and cannot be said to be suitable as a film for a film capacitor which is required to have excellent winding property (flexibility).

DISCLOSURE OF INVENTION

It is an object of the present invention to provide a highly dielectric film which has high dielectric property and low dielectric loss, can be made thin and is excellent in winding property (flexibility), and a coating composition being suitable for forming a highly dielectric film for a film capacitor.

Namely, the present invention relates to a coating composition comprising:
(A) a thermoplastic non-fluorine-containing polymer,
(B) inorganic ferroelectric particles,
(C) an affinity-improving agent comprising at least one of a coupling agent, a surfactant and an epoxy group-containing compound, and
(D) a solvent.

The coating composition is suitable for forming a highly dielectric film for a film capacitor.

Further, the present invention relates to a film, especially a highly dielectric film for a film capacitor obtained by coating the coating composition on a substrate, drying to form a film and then separating the film from the substrate.

BEST MODE FOR CARRYING OUT THE INVENTION

The coating composition of the present invention comprises:
(A) the thermoplastic non-fluorine-containing polymer,
(B) the inorganic ferroelectric particles,
(C) the affinity-improving agent comprising at least one of a coupling agent, a surfactant and an epoxy group-containing compound, and (D) the solvent.

Each component is explained below.

(A) Thermoplastic Non-Fluorine-Containing Polymer

This polymer is a base polymer of the film, and a thermoplastic non-fluorine-containing polymer having a dielectric constant of not less than 2.0, further not less than 2.5 (measured at a frequency of 10 kHz at 20° C., hereinafter the same unless otherwise specified) is preferable because it contributes to making a dielectric constant of the film high. An upper limit of the dielectric constant of the thermoplastic non-fluorine-containing polymer is usually about 6.0

Also, a polymer being easily dissolved in the solvent (D) is preferable since a film is easily formed.

The thermoplastic non-fluorine-containing polymer has satisfactory flexibility and plasticity due to its thermoplasticity when formed into a film, and when a highly dielectric film for a film capacitor is prepared using the polymer, its winding property is excellent. In addition, because of the non-fluorine-containing system, solubility is excellent, selection of a solvent and adjustment of a concentration are easy, and processability is satisfactory. Further, mechanical strength is superior as compared with a fluorine-containing polymer having solubility in a solvent.

Examples of preferred thermoplastic non-fluorine-containing polymer are, for instance, polycarbonate, cellulose, polyphenylene ether, polycycloolefin, polyphenylene oxide, polysulfone, polyether sulfone, polyvinyl chloride, polystyrene, and polymethyl methacrylate. From the viewpoint of satisfactory film forming property and heat resistance, polycarbonate, cellulose, polyphenylene ether, polycycloolefin, polysulfone, and polyether sulfone are preferable.

Examples of polycarbonate are, for instance, Iupilon (trade name) and NOVAREX (trade name) available from Mitsubishi Engineering-Plastics Corporation, etc. which provide satisfactory heat resistance, dimensional stability and mechanical strength.

Examples of cellulose are, for instance, cellulose acetate, nitrocellulose, etc. which are excellent in compatibility with inorganic ferroelectric particles and provide satisfactory mechanical strength.

Examples of polyphenylene ether are, for instance, Lupiace (trade name) and LEMALLOY (trade name) available from Mitsubishi Engineering-Plastics Corporation, etc. which provide low dielectric loss and satisfactory heat resistance.

Examples of polycycloolefin are, for instance, Zeonoa (trade name) available from ZEON CORPORATION, etc. which provide low dielectric loss and satisfactory heat resistance.

Examples of polysulfone are, for instance, UDEL (trade name) available from SOLVAY ADVANCED POLYMERS K.K., etc. which provide satisfactory heat resistance and excellent mechanical strength at high temperature.

Examples of polyether sulfone are, for instance, SUMIKA EXCEL (trade name) available from Sumitomo Chemical Industry Co., Ltd., etc. which provide satisfactory heat resistance and excellent mechanical strength at high temperature.

(B) Inorganic Ferroelectric Particles

Known inorganic ferroelectric materials (having a dielectric constant of not less than 100) which are blended to highly dielectric materials, for example, metallic oxides and compound materials, solid solutions and sol/gel forms thereof can be used. Examples thereof are, for instance, particles of titanium oxides such as barium titanate, zirconium titanate, zinc titanate, strontium titanate, calcium titanate, lead titanate, magnesium titanate and titanium oxide; antimony oxides such as barium antimonate, strontium antimonate, calcium antimonate, lead antimonate and magnesium antimonate; and tin oxides such as barium stannate and strontium stannate.

Among these, the oxide particles of barium titanate or oxide particles of lead zirconium titanate (PZT) are representative inorganic ferroelectric particles, and a dielectric constant thereof is not less than 500. Especially, oxide particles of barium titanate are preferable since they have a high dielectric constant exceeding 1,500, and are easily formed into fine particles.

An average particle size of the inorganic ferroelectric particles (B) is preferably not more than 2 μm, further preferably not more than 1.2 μm, especially preferably from about 0.01 μm to about 0.5 μm, from the viewpoint of excellent smoothness of a film surface and satisfactory homogeneous dispersibility.

A blending amount of the inorganic ferroelectric particles (B) is not less than 10 parts by mass, preferably not less than 30 parts by mass, especially preferably not less than 50 parts by mass based on 100 parts by mass of the polymer (A). When the amount is too small, an effect of improving a dielectric constant of the film becomes smaller. An upper limit thereof is 500 parts by mass. When the amount is too large, there occurs a problem with strength of the film and film surface roughness. A preferable upper limit is 400 parts by mass, further 200 parts by mass.

(C) Affinity-Improving Agent Comprising at Least One of a Coupling Agent, a Surfactant and an Epoxy Group-Containing Compound The affinity-improving agent (C) is a component playing a role of not only improving affinity of the polymer (A) for the inorganic ferroelectric particles (B) and dispersing the both homogeneously but also strongly bonding the inorganic ferroelectric particles (B) and the polymer (A) in the film. Without this component (C), voids are easily generated in the film, and a dielectric constant is decreased. Further, in the film forming composition explained infra, the component (C) functions to homogeneously disperse the inorganic ferroelectric particles and the polymer (A).

Examples of the effective affinity-improving agent (C) are a coupling agent (C1), a surfactant (C2) and an epoxy group-containing compound (C3).

Examples of the coupling agent (C1) are, for instance, a titanate coupling agent, a silane coupling agent, a zirconate coupling agent and a zircoaluminate coupling agent.

Examples of the titanate coupling agent are, for instance, those of monoalkoxy type, chelate type and coordinate type, and especially from the viewpoint of satisfactory affinity for the inorganic ferroelectric particles (B), monoalkoxy type and chelate type are preferable.

Examples of the silane coupling agent are, for instance, those of high molecular weight type and low molecular weight type, and from the viewpoint of the number of functional groups, there are monoalkoxysilane, dialkoxysilane, trialkoxysilane and Dipodal alkoxysilane. Especially, from the viewpoint of satisfactory affinity for the inorganic ferroelectric particles (B), alkoxysilanes of low molecular weight type are preferable.

Examples of the zirconate coupling agent are, for instance, monoalkoxyzirconium and trialkoxyzirconium.

Examples of the zircoaluminate coupling agent are, for instance, monoalkoxyzircoaluminate and trialkoxyzircoaluminate.

Examples of the surfactant (C2) are those of high molecular weight type and low molecular weight type, and from the viewpoint of kind of functional groups, there are a nonionic surfactant, an anionic surfactant and a cationic surfactant, and those can be used. From the viewpoint of satisfactory thermal stability, surfactants of high molecular weight type are preferable.

Examples of the nonionic surfactant are, for instance, polyether derivatives, polyvinyl pyrrolidone derivatives and alcohol derivatives, and polyether derivatives are preferable especially from the viewpoint of satisfactory affinity for the inorganic ferroelectric particles (B).

Examples of the anionic surfactant are, for instance, polymers comprising sulfonic acid, carboxylic acid or a salt thereof, and especially from the viewpoint of satisfactory affinity for the polymer (A), preferable are acrylic acid derivative type polymers, methacrylic acid derivative type polymers, and maleic anhydride type copolymers.

Examples of the cationic surfactant are, for instance, amine compounds, nitrogen-containing heterocyclic compounds such as imidazoline, and halogenated salts thereof, and compounds having a nitrogen-containing complex ring are preferable since they have less property of attacking the polymer (A). Examples of the salts are ammonium salts having halogen anion such as alkyltrimethylammonium chloride. From the viewpoint of high dielectric constant, ammonium salts comprising halogen anion are preferable.

Examples of the epoxy group-containing compound (C3) are epoxy compounds and glycidyl compounds, which may be low molecular weight compounds or high molecular weight compounds. Particularly preferable are low molecular weight compounds having one epoxy group from the viewpoint of especially satisfactory affinity for the polymer (A). In the present invention, epoxy group-containing coupling agents (for example, epoxysilane) which are classified into a coupling agent are included in the coupling agent (C1) but not in the epoxy group-containing compound (C3).

From the viewpoint of especially satisfactory affinity for the polymer (A), preferable examples of the epoxy group-containing compound (C3) are compounds represented by the formula (C3):

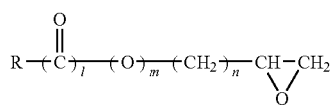

(C-3)

wherein R is hydrogen atom, a monovalent hydrocarbon group having 1 to 10 carbon atoms which may have oxygen atom, nitrogen atom or carbon-carbon double bond, or an aromatic ring which may have a substituent; l is 0 or 1; m is 0 or 1; n is 0 or an integer of 1 to 10.

Suitable examples thereof are:

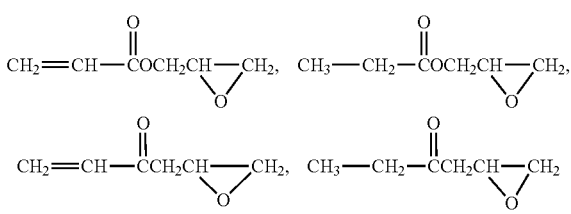

and the like, which have a ketone group or an ester group.

A blending amount of the component (C) is not less than 0.01 part by mass, preferably not less than 0.1 part by mass, especially preferably not less than 1 part by mass based on 100 parts by mass of the polymer (A). When the amount is too small, dispersing homogeneously becomes difficult. An upper limit thereof is 30 parts by mass. When the amount is too large, there occurs a problem that a dielectric constant of an obtained film is decreased. A preferable upper limit is 25 parts by mass, further preferably 20 parts by mass.

From the viewpoint of satisfactory affinity for the inorganic ferroelectric particles (B), the coupling agent (C1) and the epoxy group-containing compound (C3) are preferable as the component (C), and especially titanate coupling agents or silane coupling agents are preferable from the viewpoint of satisfactory affinity for both of the polymer (A) and the inorganic ferroelectric particles (B).

In addition, the coupling agent (C1) and the epoxy group-containing compound (C3) exhibit more satisfactory affinity-improving action since they form a chemical bond with the inorganic ferroelectric particles (B) (having a reaction group).

(D) Solvent

The solvent (D) is preferably one dispersing or dissolving the polymer (A), thereby making it possible to prepare a coating composition, and may be an inorganic solvent (water, etc.) or an organic solvent. The solvent (D) may be selected depending on kind of the polymer (A).

For example, for polycarbonate, there are ether solvents such as dioxane and tetrahydrofuran; nonpolar solvents such as chloroform and cresol; amide solvents such as dimethylformamide; and ketone solvents such as methyl ethyl ketone. Especially from the viewpoint of satisfactory stability in the case of a solvent mixture, ether solvents, amide solvents and ketone solvents are preferable.

For cellulose, there are ketone solvents such as methyl ethyl ketone; ester solvents such as ethyl acetate; ether solvents such as dioxane; and amide solvents such as dimethylformamide. Especially from the viewpoint of satisfactory stability in the case of a solvent mixture, ether solvents, amide solvents and ketone solvents are preferable.

For polyphenylene ether, there are ketone solvents, aromatic hydrocarbon solvents such as toluene and mesitylene; and chlorinated hydrocarbon solvents such as chloroform and cyclomethane. Especially from the viewpoint of satisfactory coatability, ketone solvents and aromatic hydrocarbon solvents are preferable.

For polycycloolefin, there are ketone solvents, aromatic hydrocarbon solvents and chlorinated hydrocarbon solvents. Especially from the viewpoint of satisfactory coatability, aromatic hydrocarbon solvents are preferable.

For polysulfone, there are alcohol solvents such as isopropyl alcohol and butanol, ketone solvents and chlorinated hydrocarbon solvents. Especially from the viewpoint of satisfactory coatability, alcohol solvents and ketone solvents are preferable.

For polyether sulfone, there are alcohol solvents, ketone solvents and chlorinated hydrocarbon solvents. Especially from the viewpoint of satisfactory coatability, alcohol solvents and ketone solvents are preferable.

The coating composition of the present invention may contain, as optional components, other polymer such as a fluorine-containing polymer and in addition, additives such as various fillers such as reinforcing filler and antistatic filler and a compatibilizing agent.

Examples of fluorine-containing polymer are, for instance, polyvinylidene fluoride (PVdF) polymer, vinyl fluoride polymer and fluoroethylene/vinyl ether copolymer having a high dielectric constant. These fluorine-containing polymers may be blended to an extent not to impair the object of the present invention.

Examples of a reinforcing filler are, for instance, particles and fibers of silicon carbide, silicon nitride, magnesium oxide, potassium titanate, glass, alumina and boron compounds, and examples of a compatibilizing agent are, for instance, polyolefin modified with functional group, styrene-modified polyolefin, polystyrene modified with functional group, polyacrylate imide and cumyl phenol. These may be blended to an extent not to impair the object of the present invention.

In addition, a highly dielectric organic compound, for example, copper-phthalocyanine tetramer may also be blended to an extent not to impair the object of the present invention.

In the coating composition of the present invention, it is preferable to adjust its viscosity to 0.01 to 3 Pa·s with the solvent (D) since coatability is satisfactory and a uniform and smooth film can be obtained. It is especially preferable that the viscosity is not more than 1.5 Pa·s, from the viewpoint of inhibiting roughening of a film surface. For measuring a viscosity, a cone plate viscometer VISCONE CV Series available from Misec Corporation is used. Measuring conditions are room temperature and the number of rotations of 94 rpm, and No. 2 cone (10p) is used.

The coating composition may be in the form of emulsion (solvent is water or the like). However, it is preferable that the composition is in the form of solution of polymer in an organic solvent and the component (B) is dispersed in the solution, since a homogeneous composition can be prepared and a uniform film is easily obtained.

In addition to the solvent (D), to the coating composition may be added a defoaming agent, a dispersant, a wetting agent, a leveling agent and a flowing agent as components which do not remain in the film (disappearing at the time of forming the film) or as components which do not give substantial influence on the effects (high dielectric constant, flexibility, formation of thin film) aimed at by the highly dielectric film even if they are present in the film.

The coating composition is prepared by preparing a solution of the polymer (A) in the solvent (D), optionally adding other components thereto, and then stirring, preferably stirring with heating for dispersing. Specifically there are the following methods for preparation.

(1) A method of previously mixing, stirring and dispersing the component (B) and the component (C) in the solvent (D), and then sufficiently stirring and dispersing the obtained dispersed mixture and the solution of the polymer (A):

In this method, in the case where the affinity-improving agent (C) is the coupling agent (C1) or the epoxy group-containing compound (C3) which is a chemically reactive affinity-improving agent, the components (C) and (B) may be subjected to stirring and dispersing after the reaction thereof, or may be added to the solvent (D) and then subjected to reaction and stirring and dispersing simultaneously, or the both may be carried out in combination (there is a case where this is referred to as surface treatment of the component (B)). When the affinity-improving agent is the surfactant (C2), since a reaction does not occur, it is easy to add the components (B) and (C) in the solvent (D) and then carry out reaction and stirring and dispersing simultaneously.

For enhancing stability of the dispersed mixture of the components (B) and (C), it is desirable that stirring and dispersing the components (B) and (C) are carried out in the presence of a small amount of a solution of the polymer (A).

(2) A method of adding the components (B) and (C) in a solution of the component (A) in the solvent (D) batchwise or in order and carrying out stirring and dispersing treatment:

When adding in order, the order of adding is not limited particularly, and stirring and dispersing treatment may be carried out every time when each component is added.

In any of the above-mentioned methods (1) and (2), it is desirable to previously remove adsorbed water on the surface of the component (B) by heat treatment or the like since homogeneous dispersibility is further improved. By this pre-heat treatment or surface treatment of the component (B), homogeneous dispersing becomes easy even in the case of the component (B) having a large average particle size. Preferably, it is desirable to undergo the both of pre-heat treatment and surface treatment.

A specified amount of each component may be added batchwise or dividedly. Further, when adding dividedly, the adding order and the divided addition may be combined freely, for example, in such a manner that a part of the component (A) is added when mixing the components (B) and (C), and the remaining component (A) is added after the mixing, and further the component (C) is added and mixed additionally.

In the case where homogeneous dispersion of the component (B) is difficult, it is desirable to carry out forced stirring and dispersing. If this dispersing treatment is insufficient, there is a case where solid components such as the component (B) are easily precipitated, thereby making coating difficult, and in some cases, at forming a coating film by drying, phase separation occurs inside the film, and a uniform film being excellent in mechanical characteristics and having stable dielectric characteristics cannot be formed. This stirring and dispersing treatment may be carried out for the prepared composition just before the coating.

The stirring and dispersing are to be carried out to such an extent that the composition after the stirring and dispersing does not cause phase separation (a change of turbidity of the solution is small (10% or less)) even if it is allowed to stand at room temperature (25° C.) for seven days. A degree of the stirring and dispersing can be set by preliminary experiments.

Examples of preferred stirring and dispersing equipment are ball mill, sand mill, attrition mill, Visco Mill, roll mill, banbury mixer, stone mill, vibrator mill, dispersing mill, disc impeller, jet mill and DYNO-MILL. Among these, jet mill, roll mill and DYNO-MILL are preferable from the viewpoint that mixing of impurities hardly occurs and continuous production can be carried out.

Nonlimiting examples of the stirring and dispersing conditions are as follows.
Equipment: sand mill
Stirring conditions:
  Stirring speed: 100 to 10,000 rpm
  Stirring time: 5 to 120 minutes
  Others: Glass beads are used.

A highly dielectric film can be prepared by coating the coating composition of the present invention on a substrate and then drying to form a film and separating the film from the substrate.

For the coating, a knife coating method, a cast coating method, a roll coating method, a gravure coating method, a blade coating method, a rod coating method, an air doctor coating method, a curtain coating method, a Faknelane coating method, a kiss coating method, a screen coating method, a spin coating method, a spray coating method, an extrusion coating method, and an electrodeposition coating method can be employed. Among these, a roll coating method, a gravure coating method and a cast coating method are preferable from the viewpoint that operation is easy, non-uniformity of a film thickness is small and productivity is satisfactory.

Drying can be conducted using Yankee cylinder, counter flow, hot air blasting, air flow cylinder, air through, infrared ray, microwave, and induction heating. For example, in the case of a hot air blasting method, the drying conditions of 130° to 200° C. for a period of time of one minute or less are suitably adopted.

The highly dielectric film of the present invention may be left on a substrate as a so-called coating film. When the film is used as a highly dielectric film for a film capacitor, it is separated from a substrate and used in the form of a single film. Therefore, preferable materials for a substrate are those from which the polymer (A) is easily peeled, for example, metallic sheets of stainless steel and copper; glass sheet; polymer films subjected to ITO and ZnO deposition; and polymer films subjected to treatment for giving mold releasing property. Among these, polymer films subjected to surface treatment for giving mold releasing property are preferable since they are easily peeled and productivity is high. Examples of such treatment are treatment for coating various mold releasing agents, plasma treatment and treatment for laminating a mold release film. A surface free energy (unit: $J/m^2$) of a substrate is preferably not less than 30, and its water contact angle is preferably not more than 110 degrees.

An obtained film may be used as it is, and may be stretched by usual method. In that case, a stretching ratio is desirably about 2 times to about 6 times.

In the case of the use for a highly dielectric film for a film capacitor, the obtained film may be subjected to surface treatment with other kind of polymer, plasma treatment or corona discharge treatment in order to make deposition of aluminum for an electrode easy. In addition, in order to inhibit roughening of the film surface, other kind of polymer may be coated on the film surface, and in order to improve film strength, the film may be subjected to crosslinking treatment with ultraviolet ray, electron beam or radiation.

A thickness of the so-obtained film of the present invention can be not more than 9 μm, preferably not more than 6 μm, further preferably not more than 5 μm. A lower limit of the film thickness varies depending on kind of the polymer and a particle size and a blending amount of the component (B), and is about 2 μm from the viewpoint of maintaining mechanical strength of the film.

In the film of the present invention, even in the case of a film thickness of not more than 9 μm, its dielectric constant can be not less than 9, further not less than 12 though it varies depending on kind of the polymer (A) and kind and proportion of the inorganic ferroelectric particles (B). For example, when barium titanate is blended to polycarbonate in an amount of 175% by mass, a dielectric constant is 9 to 12 in the case of a 3 μm thick film; when barium titanate is blended to cellulose in an amount of 175% by mass, a dielectric constant is 15 to 25 in the case of a 3 μm thick film; when barium titanate is blended to polyphenylene ether in an amount of 175% by mass, a dielectric constant is 9 to 20 in the case of a 3 μm thick film; when barium titanate is blended to polycycloolefin in an amount of 175% by mass, a dielectric constant is 9 to 20 in the case of a 3 μm thick film; when barium titanate is blended to polysulfone in an amount of 175% by mass, a dielectric constant is 10 to 25 in the case of a 3 μm thick film; and when barium titanate is blended to polyether sulfone in an amount of 175% by mass, a dielectric constant is 10 to 25 in the case of a 3 μm thick film.

Further, the film of the present invention has a small dielectric loss (measured at 10 kHz at 20° C., hereinafter the same unless otherwise specified). The dielectric loss varies depending on kind of the polymer (A), and is, for example, 0.05 to 3 in the case of polycarbonate; 0.1 to 4 in the case of cellulose; 0.1 to 3 in the case of polyphenylene ether; 0.05 to 3 in the case of polycycloolefin; 0.05 to 3 in the case of polysulfone; and 0.05 to 3 in the case of polyether sulfone.

Also, according to the film of the present invention, since the inorganic ferroelectric particles (B) are bonded firmly to the polymer (A) by an action of the coupling agent or the surfactant, a dense structure having a small content of voids (for example, not more than 5% by volume, further not more than 1% by volume) is obtained and a withstand voltage can be made high.

In spite of a dense structure, the film of the present invention is excellent in flexibility (winding property). For example, in the case of a 5 μm thick film, neither cracking nor breaking occurs on a bent portion at 180 degree bending test. Therefore, when the film is used for a film capacitor, processability (winding property and followability) are significantly improved.

The film of the present invention is excellent in surface smoothness, and for example, surface roughness of its center can be not more than ±1 μm, further not more than ±0.6 μm. Uniformity of electrical characteristics is improved due to excellent surface smoothness.

When the highly dielectric film of the present invention is used, for example, as a film for a film capacitor, an electrode can be formed on its surface by a deposition method or the like. For forming an electrode, known materials, and known forming methods and conditions can be employed.

EXAMPLES

The present invention is then explained by means of Examples, but is not limited to them.

Characteristic values used herein and effects thereof are those measured by the following methods.

(Dispersion Stability)

A dispersion is poured in a 50 ml glass sample bottle and allowed to stand at room temperature. One week after, dispersibility is observed with naked eyes. When homogeneity is kept, it is evaluated as ○, and when precipitation occurs, it is evaluated as X.

(Dielectric Constant and Dielectric Loss)

Using a film of a mixture of a polymer and inorganic fine particles formed on a metallic substrate or a film of a mixture of a polymer and inorganic fine particles subjected to aluminum deposition on one surface thereof, a sample is produced by carrying out aluminum deposition in vacuo on a 95 mm² area of the film surface opposite to the substrate (or the aluminum-deposited surface). An electrostatic capacity and a dielectric loss of this sample are measured at room temperature (20° C.) at a frequency of 10 kHz using an impedance analyzer (HP4194A available from Hewlett Packard).

(Film Thickness)

A thickness of a film on a substrate is measured at room temperature using a film thickness meter (CMI223 available from Oxford Instruments) subjected to zero point adjustment depending on kind of a substrate and calibration by two-point reference thicknesses.

(Flexibility)

After bending a film having a length of 20 mm, a width of 5 mm and a thickness of 5 μm by 180 degrees, cracking and deformation at a bent portion are observed with naked eyes. When there is neither cracking nor deformation at the bent portion, it is evaluated as ○.

Example 1

Into a 3-liter separable flask was poured 216 parts by mass of N,N-dimethylacetamide (DMAC) (available from Kishida Chemical Co., Ltd.), and thereto was added 40 parts by mass of cellulose acetate (available from ALDRICH), followed by dissolution by heating. The obtained solution of cellulose acetate was coated on a stainless steel substrate with a bar coater and subjected to drying with hot air at 100° C. for three minutes to prepare an about 5.0 μm thick film. A dielectric loss tangent (10 kHz) of this film was 2.5%.

Next, to 256 parts by mass of the prepared solution of cellulose acetate were added 74 parts by mass of barium titanate (BT-01 available from Sakai Chemical Industry Co., Ltd.) having an average particle size of 0.1 μm, 144 parts by mass of methyl isobutyl ketone (MIBK) and further 3.7 parts by mass of PLANEACT KR-55 available from AJINOMOTO CO., INC. as a titanate coupling agent, followed by stirring and dispersing for one hour with a rotor (BIG-ROTOR BR-2 available from AS-ONE).

To this mixture was added 2,400 parts by mass of glass beads (GB503M available from Potters-Ballotini Co., Ltd.), and the obtained mixture was poured in a water-cooled three-drum type sand grinder (A•VIEX available from AIMEX), followed by 60-minute dispersing treatment at room temperature at 1,500 rpm. After the dispersing treatment, the mixture was passed through a stainless steel mesh (available from MANABE KOGYO CO., LTD., 80 mesh) to remove the glass beads and prepare the coating composition of the present invention.

Dispersion stability of this composition was evaluated. The result is shown in Table 1.

Then the obtained composition was coated on a stainless steel substrate with a bar coater, and dried with hot air at 100° C. for three minutes to form an about 5.0 μm thick dielectric film.

Flexibility and a dielectric constant and dielectric loss tangent at a frequency of 10 kHz of the obtained film were evaluated. The results are shown in Table 1.

Example 2

Into a 3-liter separable flask was poured 216 parts by mass of tetrahydrofuran (THF) (available from Kishida Chemical Co., Ltd.), and thereto was added 40 parts by mass of polycarbonate (available from TOYOBO CO., LTD.), followed by dissolution by heating. The obtained solution of polycarbonate was coated on a stainless steel substrate with a bar coater and subjected to drying with hot air at 100° C. for three minutes to prepare an about 5.0 μm thick film. A dielectric loss tangent (10 kHz) of this film was 0.8%.

Next, to 256 parts by mass of the solution of polycarbonate were added 74 parts by mass of barium titanate (BT-01 available from Sakai Chemical Industry Co., Ltd.) having an average particle size of 0.1 μm, 144 parts by mass of MIBK and further 3.7 parts by mass of PLANEACT KR-55 available from AJINOMOTO CO., INC. as a titanate coupling agent, followed by stirring and dispersing for one hour with a rotor (BIG-ROTOR BR-2 available from AS-ONE).

To this mixture was added 2,400 parts by mass of glass beads (GB503M available from Potters-Ballotini Co., Ltd.), and the obtained mixture was poured in a water-cooled three-drum type sand grinder (A•VIEX available from AIMEX), followed by 60-minute dispersing treatment at room temperature at 1,500 rpm. After the dispersing treatment, the mixture was passed through a stainless steel mesh (available from MANABE KOGYO CO., LTD., 80 mesh) to remove the glass beads and prepare the coating composition of the present invention.

Dispersion stability of this composition was evaluated. The result is shown in Table 1.

Then the obtained composition was coated on a stainless steel substrate with a bar coater, and dried with hot air at 100° C. for three minutes to form an about 5.0 μm thick dielectric film.

Flexibility and a dielectric constant and dielectric loss tangent at a frequency of 10 kHz of the obtained film were evaluated. The results are shown in Table 1.

Examples 3 to 6

Coating compositions were prepared in the same manner as in Example 1 except that thermoplastic non-fluorine-containing polymers shown in Table 1 were used instead of cellulose acetate and solvents shown in Table 1 were used, and dispersion stability thereof was evaluated. Further, films were prepared in the same manner as in Example 1, and a film thickness, flexibility, a dielectric constant and a dielectric loss tangent were evaluated. The results are shown in Table 1.

Thermoplastic non-fluorine-containing polymers used are as follows.

Polyether sulfone: SUMIKA EXCEL (trade name) available from Sumitomo Chemical industry Co., Ltd.
Polysulfone: UDEL (trade name) available from SOLVAY ADVANCED POLYMERS K.K.
Polycycloolefin: Zeonoa (trade name) available from ZEON CORPORATION
Polyphenylene ether: Lupiace (trade name) available from Mitsubishi Engineering-Plastics Corporation

TABLE 1

| | Example | | | | | |
|---|---|---|---|---|---|---|
| | 1 | 2 | 3 | 4 | 5 | 6 |
| Coating composition (part by mass) | | | | | | |
| Component (A) | | | | | | |
| Cellulose acetate | 40 | — | — | — | — | — |
| Polycarbonate | — | 40 | — | — | — | — |
| Polyether sulfone | — | — | 40 | — | — | — |
| Polysulfone | — | — | — | 40 | — | — |
| Polycycloolefin | — | — | — | — | 40 | — |
| Polyphenylene ether | — | — | — | — | — | 40 |
| Component (B) | | | | | | |
| Barium titanate | 74 | 74 | 74 | 74 | 74 | 74 |
| Component (C) | | | | | | |
| Titanate coupling agent | 3.7 | 3.7 | 3.7 | 3.7 | 3.7 | 3.7 |
| Component (D) | | | | | | |
| DMAc | 216 | — | — | — | — | — |
| THF | — | 216 | — | — | — | — |
| MIBK | 144 | 144 | — | 360 | — | — |
| Isopropyl alcohol | — | — | 360 | — | — | — |
| Mesitylene | — | — | — | — | 260 | — |
| Chloroform | — | — | — | — | 100 | 100 |
| Toluene | — | — | — | — | — | 260 |
| Dispersion stability | ◯ | ◯ | ◯ | ◯ | ◯ | ◯ |
| Characteristics of film | | | | | | |
| Film thickness (μm) | 5.0 | 5.0 | 4.7 | 4.8 | 5.2 | 5.1 |
| Flexibility | ◯ | ◯ | ◯ | ◯ | ◯ | ◯ |
| Dielectric constant (10 kHz) | 16.0 | 9.0 | 16.0 | 15.5 | 10 | 12 |
| Dielectric loss tangent (%, 10 kHz) | 3.4 | 1.6 | 0.8 | 0.9 | 0.1 | 0.2 |

INDUSTRIAL APPLICABILITY

The film prepared from the coating composition of the present invention is high in dielectric constant, is low in dielectric loss, can be made thin, is excellent in winding property (flexibility), satisfies characteristics required as a highly dielectric film for a film capacitor, and can be prepared easily using the coating composition by an easy method.

The invention claimed is:

1. A film capacitor comprising a wound body of a high dielectric film having an electrode formed on a surface thereof, said high dielectric film having a thickness of not more than 6 μm obtained by coating a coating composition on a substrate, drying to form a film and separating the film from the substrate, said coating composition comprising:
   (A) a thermoplastic non-fluorine-containing polymer,
   (B) inorganic ferroelectric particles,
   (C) at least one affinity-improving agent selected from the group consisting of a coupling agent and an epoxy group-containing compound, and
   (D) a solvent
   wherein the inorganic ferroelectric particles (B) are contained in an amount of 50 to 200 parts by mass and the affinity-improving agent (C) is contained in an amount of 0.01 to 30 parts by mass based on 100 parts by mass of said thermoplastic non-fluorine-containing polymer (A), and said thermoplastic non-fluorine-containing polymer (A) is polycarbonate or cellulose acetate, and the epoxy group-containing compound is a compound represented by the formula (C-3):

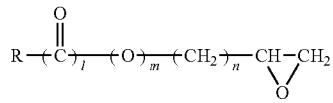

(C-3)

wherein R is hydrogen atom, a monovalent hydrocarbon group having 1 to 10 carbon atoms which may have oxygen atom, nitrogen atom or carbon-carbon double bond, or an aromatic ring which may have a substituent; 1 is 0 or 1; m is 0 or 1; n is 0 or an integer of 1 to 10.

2. The film capacitor of claim 1, wherein said inorganic ferroelectric particles (B) are oxide particles of barium titanate and/or oxide particles of lead zirconium titanate.

3. The film capacitor of claim 1, wherein the affinity-improving agent (C) is a coupling agent.

4. The film capacitor of claim 3, wherein the coupling agent is a titanate coupling agent, a silane coupling agent, a zirconate coupling agent or a zircoaluminate coupling agent.

5. The film capacitor of claim 1, wherein the thermoplastic non-fluorine-containing polymer (A) is polycarbonate.

* * * * *